Nov. 5, 1929.    H. A. S. HOWARTH    1,734,905
COOLING SYSTEM FOR BEARINGS
Filed Dec. 24, 1919    3 Sheets-Sheet 1

Witness
Chee. L. Griesbauer

Inventor
Harry A. S. Howarth,
By Mauro, Cameron, Lewis & Kerkam
Attorneys

Nov. 5, 1929.                H. A. S. HOWARTH                1,734,905
                         COOLING SYSTEM FOR BEARINGS
                           Filed Dec. 24, 1919          3 Sheets-Sheet 2
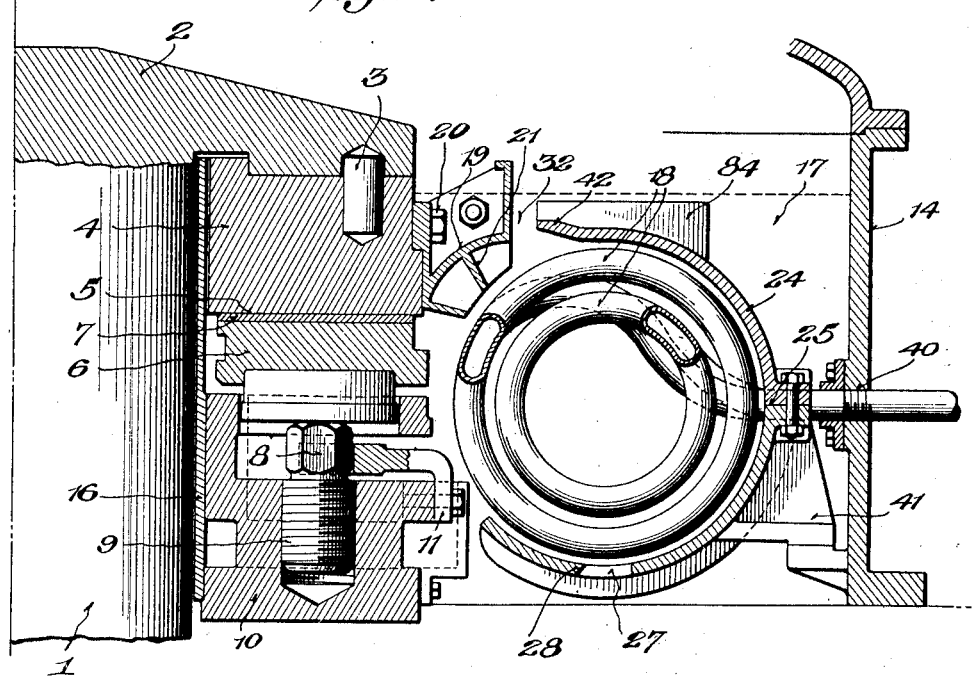
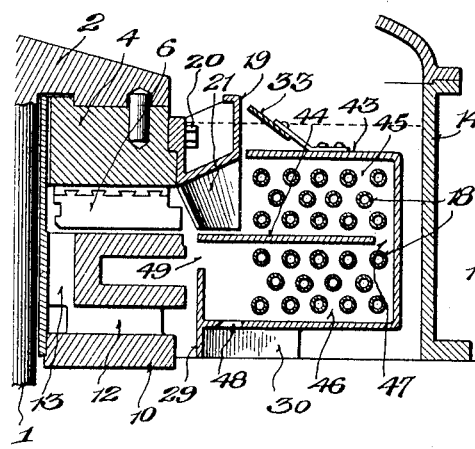
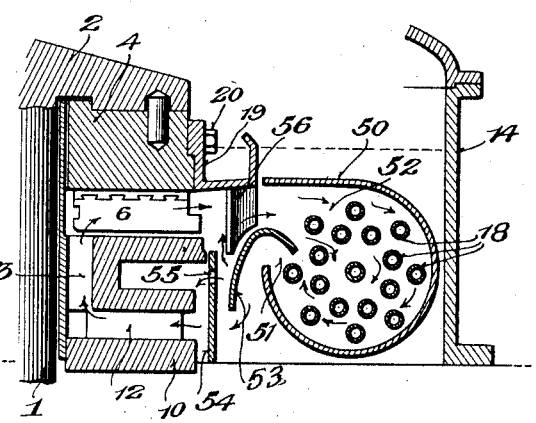

Patented Nov. 5, 1929

1,734,905

UNITED STATES PATENT OFFICE

HARRY A. S. HOWARTH, OF PITTSBURGH, PENNSYLVANIA, ASSIGNOR, BY MESNE ASSIGNMENTS, TO KINGSBURY MACHINE WORKS, INC., OF PHILADELPHIA, PENNSYLVANIA, A CORPORATION OF DELAWARE

COOLING SYSTEM FOR BEARINGS

Application filed December 24, 1919. Serial No. 347,084.

This invention relates to bearings, and more particularly, to constructions and arrangements to facilitate the dissipation of the heat generated by the friction of the rubbing surfaces of the bearing. While of utility in a wide variety of bearings, the present invention is especially useful in conjunction with bearings carrying relatively heavy loads or rotating at relatively high speeds or both. It has heretofore been proposed to provide a bearing having bearing surfaces which operate in a bath of oil and a cooling coil in said bath of oil together with one or more baffles or walls for directing the flow of oil, produced by the operation of the bearing, through said cooling coil. Experience has demonstrated that, particularly with bearings operating under heavy loads or at high speeds or both, the friction at the rubbing surfaces may generate so much heat as to raise to an undesirable extent the temperature of the lubricating oil. This is none the less true although the proportional power expended in overcoming friction is relatively small because, with bearings of the aforesaid character, the absolute power so expended may be relatively large. It is an object of this invention to provide a bearing with means which will ensure the maintenance of a suitable operating temperature for the lubricating oil even though the absolute power converted by friction into heat may be relatively large.

A further object of this invention is to provide a bearing with means for effectively cooling the lubricating oil under the aforesaid conditions which does not necessitate the employment of a relatively expensive and complicated installation exterior of the bearing for properly cooling the lubricating oil—in other words, to provide a bearing with self-contained cooling instrumentalities for the lubricating oil which is effective in dissipating relatively large quantities of heat.

A further object of this invention is to provide a bearing, having a cooling coil in its oil well, with one or more members for separating the circulating oil from the free surface of the oil in the well and for directing the path of the circulating oil with respect to the cooling coil so as to effect an efficient dissipation of the heat abstracted from the bearing surfaces.

A further object of this invention is to provide a bearing having a cooling coil in its oil well, with passages for oil circulation whereby the hot oil leaving the bearing surfaces will be mixed with an adequate volume of oil that has been cooled by the coil and a relatively vigorous circulation of oil be maintained through the coil.

Another object of the invention is to provide a bearing with means on the rotatable member thereof for aiding or directing the circulation of lubricating oil into heat-interchanging relation with a cooling coil.

Another object of the invention is to provide a bearing wherein the lubricating oil is circulated vigorously through a cooling coil without carrying with it substantial quantities of entrained air.

A further object of the invention is to provide a bearing with means for effecting the proper cooling of the lubricating oil which is simple in construction so as not to unnecessarily complicate the bearing, which is inexpensive to make and install, and which is highly efficient in performing its function of dissipating the heat. Other objects will appear as the description of the invention proceeds.

Stated broadly, the invention comprises a bearing composed of rotatable and stationary bearing members, in combination with an oil well for supplying the bearing surfaces of said members with oil, a cooling coil in said oil well, and means associated with said coil for directing the circulation of oil with respect thereto, to separate the circulating oil from the free surface of the oil in the well and to provide mixture of the hot oil leaving the bearing surfaces with adequate volumes of cooled oil before moving into heat interchanging relation with said coil. Preferably the rotatable bearing member is also provided with means for aiding the directing of the circulating oil into heat interchanging relation with the cooling coil.

The invention is capable of receiving a variety of mechanical expressions, several of which are shown on the accompanying drawings, but it is to be expressly understood that the drawings are for purposes of illustration only and are not to be construed as a definition of the limits of the invention, reference being had to the appended claims for that purpose.

In said drawings:

Fig. 4 is a vertical half-section of another embodiment of the present invention;

Fig. 5 is a vertical half-section of still another embodiment of the present invention;

Fig. 6 is a more or less schematic vertical half-section of yet another embodiment of the present invention;

Figure 1:
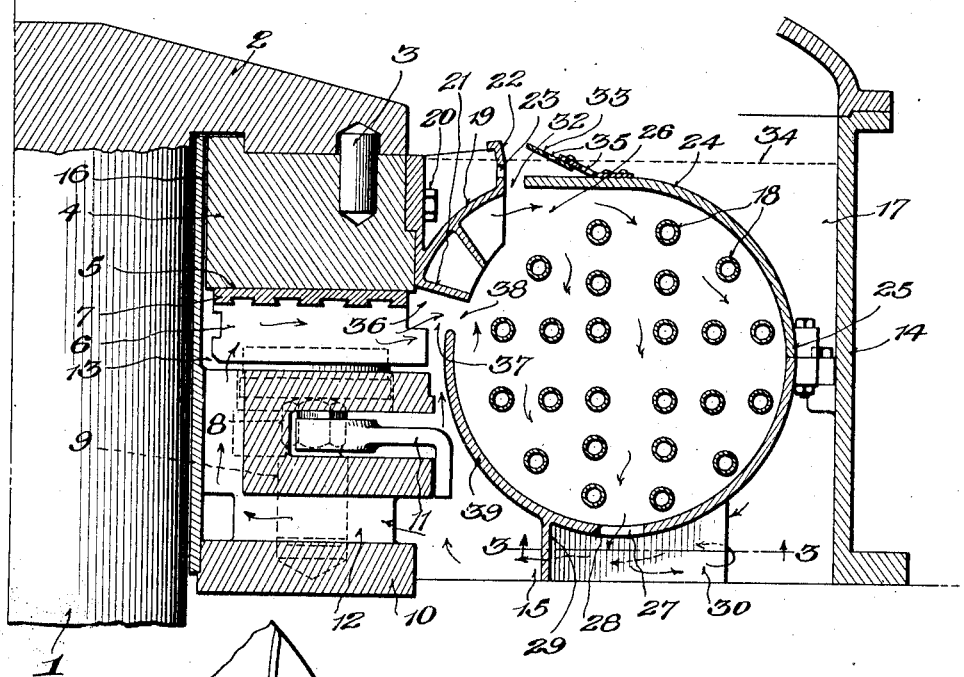
Fig. 1 is a vertical half-section of a thrust bearing embodying the present invention.
Figure 2:
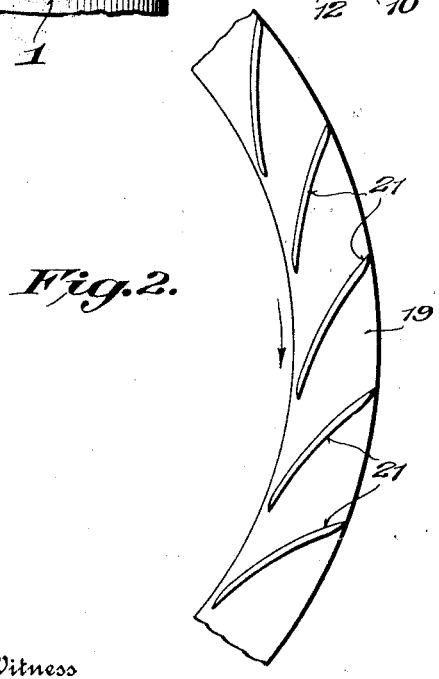
Fig. 2 is a schematic plan of the impeller ring.
Figure 3:
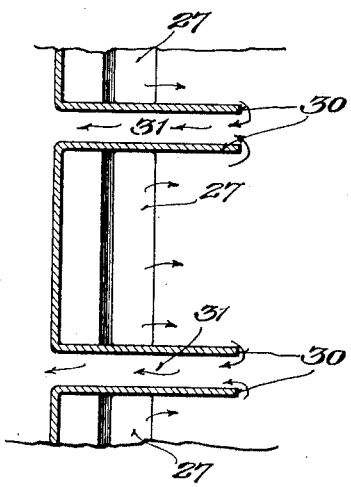
Fig. 3 is a fragmentary plan showing a desirable arrangement of baffle plates.

In the form shown in Figs. 1 to 3, the invention is embodied in a vertical thrust bearing of known construction. The structure of the bearing itself constitutes no part of the present invention as said bearing may be of any suitable construction. In the form illustrated, a vertical shaft 1 is provided with a thrust block 2 to which is suitably secured, as by dowel pins 3, a runner or thrust collar 4 provided with a bearing surface 5. Coacting with said thrust collar 4 is a stationary bearing member which is shown as composed of a plurality of segmental bearing portions or shoes 6 provided with bearing surfaces 7, although if desired said stationary bearing member may be composed of a continuous or semi-continuous flexible or rigid construction. Said segmental bearing portions 6 are preferably mounted to tilt both radially and circumferentially—circumferentially to provide for the automatic formation of wedge-shaped oil films between the bearing surfaces and radially to equitably distribute the bearing pressure on the concentric zones of the bearing surfaces in accordance with the principles of the Kingsbury bearings—and to this end, they are shown as mounted on the spherical heads 8 of tap bolts 9 adjustably threaded into the base ring 10. To retain said bolts in adjusted position a lock wrench 11 is shown as in engagement with the head of each bolt and suitably mounted on said base ring. It is to be expressly understood, however, that any other suitable means for mounting or adjusting the position of the bearing members may be employed if desired. Said base ring is suitably provided with passages as shown at 12 to provide for movement of the lubricating oil inward to the annular space 13 at the inner periphery of the bearing surfaces, whence the said oil flows outward between the bearing members and surfaces.

Said bearing members operate in a bath of oil and, to this end, an oil well is provided in any suitable way. In the form shown, an outer retaining wall 14 is suitably mounted on the frame or foundation 15 and an inner retaining wall 16 is suitably mounted on the base ring 10 and closely surrounds the shaft 1.

Mounted within the oil well or reservoir 17 thus provided is a cooling coil 18 of any suitable construction and through which any suitable cooling fluid, as water, may be circulated in any suitable way. Said coil may extend partly or entirely around the shaft and may consist of one or more helical coils coaxial with the shaft, or one or more helical coils having their axis or axes in a plane or planes at right angles to or inclined to the axis of the shaft. In Fig. 1 said coil is shown as composed of a plurality of helical coils coaxial with the shaft; in Fig. 4 said coil is shown as composed of a plurality of coaxial helical coils having their axes in a plane at right angles to the axis of the shaft; while in Figs. 5 and 7 other arrangements employing a plurality of helical coils coaxial with the shaft are illustrated. Each coil may be constructed as a unit or it may be composed of sections, and said coils may have their inlets and outlets spaced apart as on the opposite sides of the shaft or in adjacency as diagrammatically illustrated in Fig. 7.

When the bearing is in operation, the centrifugal action of the rotatable bearing member on the oil flowing into contact therewith causes said oil to be moved outwardly, and thereby the rotatable bearing member sets the oil into circulation. This circulation may be aided by means mounted on the rotatable bearing member. In the form shown in Figs. 1 to 3, an impeller ring 19 is suitably mounted as by bolts 20 on the thrust collar and may desirably be made in sections to facilitate application and removal of the same. Said impeller ring is provided with means, as a suitably formed surface, for acting on the oil as it comes from the bearing members or surfaces and directing it into heat-interchanging relation with the cooling coil. In the embodiment illustrated in Figs. 1 to 3, however, said impeller ring 19 has a plurality of vanes 21 extending substantially in a normal direction toward the cooling coil 18. Said vanes should be so shaped as to accelerate the oil gradually up to the velocity at which it is desired that the same leave said vanes and to throw the oil therefrom in the desired direction. The exact shape of the vanes, therefore, will vary with different sizes and speeds of bearings and with different constructions and arrangements of the cooling coil and the associated parts. Experience has demonstrated, however, that it is desirable that the oil be caused to move at a moderate velocity along and across the cooling coil and, accordingly, said vanes are preferably of the general shape shown in Fig. 2 so as to cause the oil to leave the vanes in such a direction that it tends to flow both circumferentially or longitudinally and transversely of the coil.

The outer face of said impeller ring 19 may be made cylindrical or, as shown at 22 in Fig. 1, it may be slightly coned to a line just below the surface of the oil in the reservoir or well 17 so that said surface will tend to depress the level of the oil rather than raise it. To permit the escape of any oil that may collect in said impeller ring 19 the same may be provided with a plurality of small apertures 23 just below the surface of the oil.

To control and direct the flow of the oil the cooling coil 18 is preferably more or less surrounded by a housing or baffle means so shaped and arranged as to direct the oil into intimate heat-interchanging relation with said coil. Said housing may also provide or constitute a part of the outer retaining wall of the oil reservoir, or it may be made a separate and distinct housing suitably mounted in said reservoir. When the wall of the oil well is constituted in whole or in part by the housing of the cooling coil channels or pipes of any suitable construction and arrangement may be employed to convey to the main body of the oil in the well any oil that flows out of the upper part of said housing. In the form shown in Fig. 1, the housing 24 is shown as separate and distinct from the wall 14 of the reservoir and as suitably connected to or mounted on said wall. While said housing may be of any suitable shape it is here shown as substantially circular in cross section; furthermore, it is preferably made in halves as indicated at 25 to facilitate assembly of the coil and housing and so that the upper section may be removed without disturbing the lower section for purposes of inspection. Said housing 24 is shown as mounted eccentrically with respect to the axis of the coil 18 so as to provide a space 26, at the inlet side of said housing, in which the impeller operates.

Oil entering the housing 24 is caused to flow through the same and out through a suitably arranged outlet aperture or apertures. In the form shown in Fig. 1, the outlet apertures 27 are positioned at the bottom of the housing and are shown as provided with a sharp edge 28 to deflect through said outlet any dirt or sediment that might otherwise be moved along the inner face of the housing by the circulating oil. It is desirable that the oil leaving the housing not flow directly to the bearing surfaces owing to the sediment that may exist therein. Accordingly, in the structure shown in Fig. 1, a baffle wall 29 is interposed between the outlets 27 and the passages to the bearing surfaces, and is provided with a plurality of outwardly-extending deflecting walls 30 which provide intermediate inlet passages 31 extending through said wall 29. The outlet apertures 27 are preferably closed where they bridge said passages 31 so that all of the oil flowing through said outlet apertures 27 is caused to flow radially outward, as indicated by the arrows in Figs. 1 and 3, whence it flows radially inward through the passages 31, and tends to deposit its sediment or sludge in the outer bottom portion of the well or reservoir.

A space 32 is preferably left between the periphery of the impeller ring and the adjacent wall of the housing 24 so as to permit the escape of air that may be entrained in the oil. On the other hand, to control or prevent circulation of the oil around the exterior of the housing a baffle plate 33 is preferably mounted on the outer wall of said housing adjacent said opening 32 and extends slightly above the surface 34 of the oil. While this baffle plate 33 may be imperforate, it may be desirably provided with a plurality of apertures 35 to permit the passage of oil and air so that the latter may escape directly from the oil or from the free surface of the oil beyond.

In operation, the impeller blades 21 rotate with the rotatable bearing member 4 and take up hot oil at 36 where it flows from between the bearing members and surfaces and cool oil at 37 where it flows around the exterior of the housing 24 between said housing and the bearing members and at 38 where it flows around the inside of the housing 24, and, accelerating said oil, discharges the same in a direction circumferentially or longitudinally and transversely of the coil into the space 26 at the inlet side of the housing 24. The circulation of oil thus positively induced is controlled and directed by the walls of the housing 24 so that said oil is caused to flow into intimate heat-interchanging relation with the cooling coil. While some of the oil follows the inner face of the housing and returns to the vanes 21 through the space at 38, a large part of the oil flows from the housing 24 through the outlets 27 and is deflected radially outward by the baffle walls 29 and 30. The cool oil then flows radially inward through the passages 31, the abrupt changes in the direction of its flow causing it to deposit the major portion of its sediment in the outer portion of the well or reservoir. The oil flowing inward through the passages 31 divides, and while part flows between the inner wall 39 of the housing and the bearing members, a sufficient quantity of oil to maintain the bearing surfaces suitably lubricated flows through the passages 12 and annular space 13 to the bearing surfaces 5 and 7. Air that has been entrained in the oil may escape through the passage 32, and where apertures 35 are provided a small circulation of oil is permitted through the baffle and the escape of air at the free surface of the oil is facilitated. At the same time, any considerable circulation of oil around the exterior of the housing is effectively prevented by the baffle plate 33.

The inner wall 39 of the housing 24 is not essential, but is preferably employed to prevent whirling of the oil adjacent the inlet ends of the blades 21. Said wall, however, may be omitted and the blades 21 be extended downwardly. On the other hand, if the construction of the thrust bearing is such as to provide for the radial removal of the bearing shoes 6 when the load is taken off of the bearing, it is preferable not to extend the vanes 21 of the impeller below the horizontal plane of the bearing surfaces as otherwise the impeller ring would interfere with the radial removal of said shoes.

In the embodiment of the invention shown in Fig. 4, the cooling coil 18 is shown as composed of a plurality of coaxial helical coils having their axes in a plane at right angles to the shaft and provided with suitable inlet and outlet connections 40 which extend through the wall of the well. When a plurality of coils or sections are employed in this or other arrangements, headers may be provided at the inlet and outlet ends of said coils. The housing or baffle means 24, which in this arrangement is also substantially circular in cross section, is shown as mounted on the wall of the well by the use of brackets 41. In this arrangement the baffle plates 29 and 30 are omitted so that the oil may return directly to the bearing surfaces and to the inlet of the housing from the outlet of the housing. The inner wall 39 of the housing 24 is also omitted in this arrangement so that the cooling coil may be brought into closer relation to the bearing members. The upper baffle plate 33 is also omitted in this arrangement, but the upper wall of the housing is shown upwardly deflected at 42 to prevent excessive circulation of the oil around the exterior of the housing. Radial ribs 84 may also be provided on the exterior of the housing to prevent eddying or whirling of the oil. As in the structure of Fig. 1, a space is provided at 32 for the escape of air entrained in the oil, while the relatively quiet surface of the oil afforded by use of the ribs 84 facilitates escape of air that may be entrained in the oil.

In the form shown in Fig. 5, the housing or baffle means 43 is substantially rectangular in cross section and is provided with an interior partition 44 so as to divide the interior of said housing into upper and lower chambers 45 and 46 which communicate through a passage 47 at the free end of said partition 44. By this arrangement the oil is caused to flow radially outward in heat-interchanging relation with the cooling pipes in the upper chamber 45 and then to flow radially inward in heat-interchanging relation with the cooling pipes in the lower chamber 46. From the latter chamber a portion of the oil escapes through the outlet or outlets 48 while another portion of the oil returns to the space between the housing and the bearing members and the inlet of the housing through the outlet or outlets 49. As in the arrangement of Fig. 1, baffle plates 29 and 30 may be provided to secure the deposition of sediment in the outer portion of the reservoir but, as in the arrangement of Fig. 4, these baffle plates may be omitted. In the structure of Fig. 5, the impeller vanes 21 are shown as projecting materially below the horizontal plane of the bearing surfaces and as delivering substantially radially into the housing 43. This arrangement is calculated to effect a more nearly horizontal movement of the oil into heat-interchanging relation with the cooling coil.

In the form shown in Fig. 6, the housing or baffle means 50 is again made substantially circular in cross section but is provided with an outlet 51 adjacent the inlet 52, a flow-directing wall 53 being shown as separating the inlet and outlet and controlling the direction of the oil circulation. In this arrangement, a stationary baffle plate 54 is shown as positioned between the cooling coil and the bearing members and provided with apertures 55 through which the oil may return to the bearing surfaces while the remainder of the circulating oil flows upwardly into adjacency to the inlet to the housing.

Figure 7:
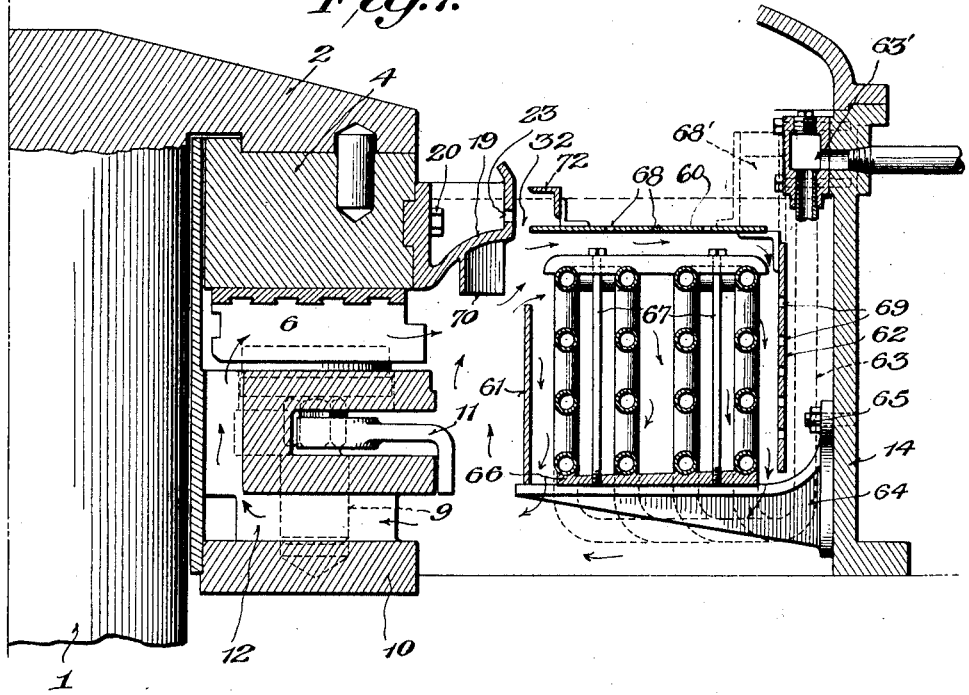
Fig. 7 is a vertical half-section of another embodiment of the present invention.

In the preferred form which is shown in Fig. 7 the housing is provided by an upper baffle wall 60 and inner and outer baffle walls 61 and 62. The walls 60 and 62 are preferably connected into a removable unit as by an interposed angle iron, and are supported in spaced relation from the coil when in operative position by separators or brackets of any suitable construction. The inner wall 61 may have upwardly-extending projections which aid in supporting the inner edge of the upper wall 60. In this embodiment, the cooling coil is shown as composed of a plurality of coaxial, vertically arranged helical coils connected in pairs and having their inlet and outlet pipes 63 in adjacency. Said inlet and outlet pipes are preferably carried below the lower edge of the wall 62 and then bent upwardly through the open bottom of the housing for connection with the coils proper so as not to interfere with the application and withdrawal of the removable side wall 62. Said pipes 63, where they pass through the wall 14, preferably have a union whereby the coil may be withdrawn vertically from the wall as a unit. Such a union is shown at 63'.

Said cooling coil may be supported in any suitable way. In the form shown, a plurality of brackets 64 are suitably secured to the outer wall of the reservoir as by bolts 65 and carry the inner wall 61 and saddle blocks 66 of relatively soft material such as wood for supporting the piping. Distance pieces of similar material are also preferably interposed between the sections of the coil so as to prevent injury in case of vibration, and the coils may be firmly clamped on the saddle blocks by bolts 67 so as to constitute a readily removable unit. Said brackets 64 may be omitted and legs on the saddle blocks 66 support the coil unit on the bottom of the well—a desirable construction when the wall 14 is made integral with the base.

To facilitate the escape of air, said upper wall 60 may be provided with a plurality of small apertures 68, or the housing may be provided with an extension as indicated at 68' in dotted lines, said extension providing a free surface for the escape of air and maintaining a head on the oil in the housing to aid in the desired circulation. When either of these expedients is employed to permit escape of air the opening 32 may be diminished or entirely omitted. The outer wall 62 may also be provided with a plurality of apertures 69 to permit the escape of oil therethrough and thereby increase the effectiveness of the outer coil. The inner wall 61 may be entirely omitted, but is preferably provided to prevent whirling of the oil adjacent the impeller blades 70. As shown, the cooling coil and its housing are preferably so arranged that the coil and housing may be removed without disturbing the impeller ring.

Figure 8:
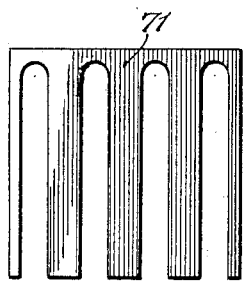
Fig. 8 is an elevation of a baffle plate that may be employed in the housing of the cooling coil.

The interior of the housing shown in Fig. 7 may be divided into a plurality of compartments by a plurality of baffle plates 71 of the construction illustrated in Fig. 8. Said baffle plates are preferably so constructed as to be readily removable and, as shown, may be provided with elongated slots so that they may straddle the coils. Said baffle plates may be positioned vertically or they may be inclined to the vertical; but they are preferably so mounted as to be substantially parallel to the direction of flow of the oil.

As shown in Fig. 7, the upper baffle plate 72 may be composed of angle irons suitably attached and mounted on the housing and, if apertures are to be provided therethrough, the lower angle iron may be composed of separated sections to provide intermediate spaces between the sections.

As in the other embodiments of this invention, the hot oil as it leaves the bearing surfaces moves, or is moved, outwardly under the action of centrifugal force, and becomes mixed with a substantial volume of circulating oil which rises between the inner wall or baffle 61 and the outer periphery of the bearing members. The temperature of the hot oil is thus reduced by intermixture with the relatively cool oil which is passed through the coil and is rising through said passage, and the combined current is directed through the inlet afforded between the inner wall 61 and the top wall 60, which is spaced from the bearing surfaces but opposed thereto in substantially radial alignment therewith. The circulating oil is separated from the free surface of the oil in the well by the top wall or baffle 60, and the circulating oil fans out and is deflected downwardly by the wall 62 radially outside of the coil, so that the moving oil is brought into intimate heat interchanging relation with the coil. The circulating oil flows out through the bottom of the housing, which in this embodiment is left entirely open, and then subdivides, so much of the circulating oil as is required flowing radially inward through the passages 12 and thence to the bearing members, while the remainder of the circulating oil rises through the passage between the wall 61 and the outer periphery of the bearing members to mix with more hot oil leaving the bearing surfaces. Thus a considerable volume of oil is maintained in vigorous circulation through the inlet of the coil housing, downwardly through the coil and housing, and upwardly between the periphery of the bearing members and the coil or the inner wall of its housing, somewhat after the nature of a vortex, while a portion of the circulating coil, after it is cooled by passage through the coil and its housing, leaves the main current and flows upwardly radially inside of the bearing members to and between the bearing surfaces, abstracting heat therefrom, and then mixing with the aforesaid main current of cool oil as it flows from the bearing surfaces.

In all of these embodiments of the invention, the oil is positively circulated by the impeller on the rotatable bearing member and fed thereby into heat-interchanging relation with the cooling coil. The circulation thus created is controlled and directed by the construction and arrangement of the housing for said coil, the oil spreading out as it flows through the housing and the current being sub-divided by the pipes of the coil so as to ensure an intimate contact of the oil with the cooling surfaces of said coil, its velocity decreasing as the oil progresses through the housing. The inlets and outlets of the housing and the spacing of the pipes are selected to effect as far as possible a uniform distribution of the oil through the housing and its intimate contact with the pipes of the coil. The impeller maintains the body of oil in the housing in circulation while feeding in hot oil from the bearing surfaces and mixing it with cooled oil which rises through the space provided between the periphery of the bearing members and the inner wall of the housing—or the cooling coil when such inner wall is omitted. When the oil is thus circulated through a housing of generally circular cross section the effect of centrifugal force is to cause the hotter and less dense oil to flow to the center, whereby the central portion of the coil is rendered effective in cooling the hotter oil. As practically all of the oil in the well is maintained in continuous circulation in heat-interchanging relation with the coil, the oil is effectively cooled even though the generation of heat by the friction of the bearing surfaces be relatively great. At the same time, the proper cooling of the oil is effected without undue complication of the bearing and without the use of elaborate or expensive exterior means for abstracting the heat from the oil.

Figure 9:
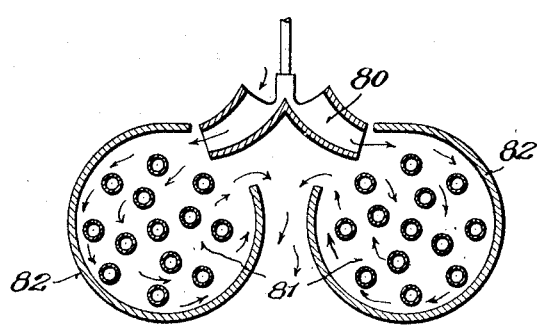
Fig. 9 is a schematic sectional elevation of another embodiment of the present invention.

In place of vanes on the rotatable bearing member, its peripheral surface or the surface of a ring mounted thereon may be so shaped, as by having an upwardly and outwardly suitably curved surface, as to impel the oil and thereby induce a circulation thereof. While the means for positively circulating the oil preferably takes the form of an oil-impelling or directing device on or moved by the rotatable bearing member, it is within the purview of this invention to have a pump in the reservoir of any suitable construction feed the oil into heat-interchanging relation with a cooling coil constructed and arranged in accordance with the present invention. Such an arrangement is shown more or less schematically in Fig. 9 wherein a pump 80, of any suitable construction and driven in any suitable way, as by gearing from the thrust collar or the shaft, positively feeds the oil into heat-interchanging relation with one or more coils 81 in housings 82. The coils with their housings and the pump may then constitute a readily removable unit.

Moreover, while vaned or other oil impelling means have been disclosed in conjunction with the several embodiments, the oil may be maintained in sufficiently vigorous circulation by the centrifugal action of the rotatable bearing member so that vaned or other oil impelling or directing means associated with the rotatable bearing member become unnecessary. But in either event, the present invention provides highly efficient means for effecting the dissipation of heat abstracted from the bearing members, because the hot oil as it flows from the bearing members is mixed with an adequate volume of cool oil flowing in the passage between the bearing members and the coil or its housing, and then directed into heat interchanging relation with the coil, in a manner that insures efficient cooling of the oil without stagnation or undue aeration of the oil. The body of circulating oil is separated from the free surface of the oil by the upper baffle or housing top, and therefore the danger of excessive amounts of air being entrained with the circulating oil is avoided. At the same time, a vigorous circulation of oil is maintained through the coil because of the volume of oil which is maintained in movement downwardly through the coil and upwardly outside of the coil, between the same and the bearing members. Therefore effective cooling of the oil is secured by use of a coil contained in the bearing structure, and the need for a separate oil circulating and cooling system outside of the bearing structure has been eliminated.

While the embodiments of the invention shown on the drawings have been described with considerable particularity it is to be expressly understood that the invention is not limited thereto, as the same is capable of receiving a variety of mechanical expressions some of which will readily suggest themselves to those skilled in the art, while certain features thereof are capable of use without other features thereof. Furthermore it is to be expressly understood that features of construction shown in connection with only one or more of the structures may be employed in conjunction with other of the structures without departing from the spirit of this invention. Reference is therefore to be had to the appended claims for a definition of the limits of the invention.

In the claims the term "housing" is used generically to designate any suitable construction or arrangement of walls, the radially outermost of which may be the wall of the oil well itself, on two or more sides of the coil for partially or wholly enclosing the cooling coil (except for suitable inlet and outlet openings) and directing the circulating oil into heat interchanging relation therewith.

What I claim is:—

1. In a bearing, in combination with a rotatable bearing member and a stationary bearing member, means for supplying the bearing surfaces of said members with oil, a cooling coil for said oil, and means associated with the rotatable bearing member and acting on the oil as it leaves the bearing surfaces for directing the oil into heat interchanging relation with said coil.

2. In a bearing, in combination with a rotatable bearing member and a stationary bearing member, means for supplying the bearing surfaces of said members with oil, a cooling coil for said oil, and means associated with said rotatable bearing member and acting on the oil as it leaves the bearing members for positively circulating said oil through said coil in heat-interchanging relation therewith.

3. In a bearing, in combination with a rotatable bearing member and a stationary bearing member, an oil well in which said bearing members operate, a cooling coil in said well, and means in said well acting on the oil as it comes from the bearing surfaces for positively moving the oil into heat-interchanging relation with said coil.

4. In a bearing, in combination with a rotatable bearing member and a stationary bearing member, an oil well in which said bearing members operate, a cooling coil in said well spaced from said stationary bearing member to provide a passage through which the oil may circulate, and baffle means between said coil and the free surface of the oil.

5. In a bearing, in combination with a rotatable bearing member and a stationary bearing member, an oil well in which said bearing members operate, a cooling coil in said well, and means in said well acting on the oil as it comes from the bearing members for directing the oil transversely of said coil in heat-interchanging relation therewith.

6. In a bearing, in combination with a rotatable bearing member and a stationary bearing member, an oil well in which said bearing members operate, a cooling coil in said well, and means carried by said rotatable member for directing the oil as it leaves the bearing surfaces directly into heat-interchanging relation with said coil.

7. In a bearing, in combination with a rotatable bearing member and a stationary bearing member, an oil well in which said bearing members operate, a cooling coil in said well, and means associated with said rotatable bearing member for feeding the oil as it comes from the bearing surfaces directly through said coil.

8. In a bearing, in combination with a rotatable bearing member and a stationary bearing member, an oil well in which said bearing members operate, a cooling coil in said well, means movable with said rotatable bearing member for directing the oil as it comes from the bearing surfaces directly through said coil, and means for directing the flow of oil produced by said last-named means.

9. In a bearing, in combination with a rotatable bearing member and a stationary bearing member, an oil well in which said bearing members operate, a cooling coil in said well, a housing providing a space in which said coil is received and arranged to direct the flow of oil therethrough, and means on the rotatable bearing member for directing the oil into said housing as it comes from the bearing surfaces.

10. In a bearing, in combination with a rotatable bearing member and a stationary bearing member, an oil well in which said bearing members operate, a cooling coil in said well, a housing providing a space in which said coil is received and having an inlet and an outlet, and means rotating with said rotatable bearing member in proximity to said inlet for directing the oil through said housing.

11. In a bearing, in combination with a rotatable bearing member and a stationary bearing member, an oil well in which said bearing members operate, a cooling coil in said well, and a housing for said coil providing a passage between the same and said stationary bearing member through which the oil may circulate.

12. In a bearing, in combination with a rotatable bearing member and a stationary bearing member, an oil well in which said bearing members operate, a cooling coil in said well, a housing for said coil, means for feeding the oil through said housing, and baffle plates on the outlet side of said housing to effect the deposit of sediment.

13. In a bearing, in combination with a rotatable bearing member and a stationary bearing member, an oil well in which said bearing members operate, a cooling coil in said well, a housing for said coil, means for feeding the oil through said housing, and a baffle exterior of said housing to control circulation of oil around the outside of said housing.

14. In a bearing, in combination with a rotatable bearing member and a stationary bearing member, an oil well in which said bearing members operate, a cooling coil in said well, and walls above and radially outside of said coil for directing the circulation of oil through the coil as it comes from the bearing surfaces.

15. In a bearing, in combination with a rotatable bearing member and a stationary bearing member, an oil well in which said bearing members operate, a cooling coil in said well, a housing for said coil provided with an inlet, and vanes movable with said rotatable bearing member for directing the oil as it comes from the bearing surfaces circumferentially and radially into said inlet.

16. A thrust bearing comprising rotatable and stationary bearing members provided with cooperating bearing surfaces, an oil well for supplying said bearing surfaces with lubricant, a cooling coil in said well, and a housing for said coil having an inlet spaced radially from said bearing members and disposed at an angle to the plane of said bearing surfaces, to receive the circulation of oil induced by the rotation of said rotatable bearing member.

17. A thrust bearing comprising rotatable and stationary bearing members provided with cooperating bearing surfaces, an oil well for supplying said bearing surfaces with lubricant, a cooling coil in said well, and walls above and radially inside of said coil for directing the circulation of oil with respect to said coil as it comes from said bearing surfaces.

18. A thrust bearing comprising rotatable and stationary bearing members provided with cooperating bearing surfaces, an oil well for supplying said bearing surfaces with lubricant, a cooling coil in said well, a wall above said coil, a wall radially inside of said coil and spaced from said bearing members to provide a passage, said last-named wall providing an inlet to said coil, and means on the periphery of said rotatable bearing member for directing the oil as it comes from the bearing surfaces into heat-interchanging relation with said coil.

19. A thrust bearing comprising rotatable and stationary bearing members provided with cooperating bearing surfaces, an oil well for supplying said bearing surfaces with lubricant, a cooling coil in said well, a wall above said coil, and a wall radially inside of said coil and providing an inlet to said coil, said last-named wall being spaced from said bearing members to provide a passage for the flow of oil to said inlet.

20. A thrust bearing comprising a rotatable and stationary bearing members provided with cooperating bearing surfaces, an oil well for supplying said bearing surfaces with lubricant, a cooling coil in said wall, and means associated with said rotatable bearing member for directing the oil circumferentially and radially into heat-interchanging relation with said coil as it comes from the bearing surfaces.

21. In a bearing, in combination with a rotatable bearing member and a stationary bearing member, means for supplying the bearing surfaces of said members with oil, a cooling coil for said oil, and means substantially in alignment with said bearing surfaces for directing the oil as it leaves said bearing surfaces into heat-interchanging relation with said coil.

22. In a bearing, in combination with a rotatable bearing member and a stationary bearing member, an oil well in which said bearing members operate, a cooling coil in said well, a wall above said coil and below the free surface of the oil, a wall radially outside of said coil, and a wall radially inside of said coil and providing an inlet to said coil in substantial alignment with the bearing surfaces.

23. In a bearing, in combination with a rotatable bearing member and a stationary bearing member, an oil well for supplying the bearing surfaces of said members with oil, a cooling coil in said well, a wall above said coil and below the free surface of the oil, and a wall radially inside of said coil and providing an inlet to said coil in substantial alignment with the bearing surfaces.

24. In a bearing, in combination with a rotatable bearing member and a stationary bearing member, an oil well in which said bearing members operate, a cooling coil in said well, means associated with said rotatable bearing member for directing the oil as it comes from the bearing surfaces, and a wall in said well above said coil for directing the oil into heat-interchanging relation with said coil.

25. In a bearing, in combination with a rotatable bearing member and a stationary bearing member, an oil well in which said bearing members operate, a cooling coil in said well, vanes on said rotatable bearing member for circulating the oil, means in said well for directing the oil into heat-interchanging relation with said coil, and means in said well to prevent eddying of the oil adjacent said vanes.

26. In a bearing, in combination with relatively rotatable bearing members, an oil well for supplying the bearing surfaces of said members with oil, a cooling coil in said well, a wall above said coil and a wall radially inside of said coil and spaced from said bearing members, said last-named wall being spaced from said first-named wall to provide an inlet to said coil in substantially horizontal alignment with the bearing surfaces.

27. In a bearing, in combination with relatively rotatable bearing members, an oil well for supplying the bearing surfaces of said members with oil, a cooling coil in said well, and a baffle wall between said coil and said bearing members and spaced from said bearing members to provide a passage through which the oil may flow from the coil exteriorly of the bearing members.

28. In a bearing, in combination with relatively rotatable bearing members, an oil well for supplyng the bearing surfaces of said members with oil, a cooling coil in said well, and a housing for said coil having an inlet substantially in alignment with said bearing surfaces for receiving the circulating oil, said housing affording a passage between the same and said bearing members whereby oil circulated through said housing may return to said inlet exteriorly of said housing.

29. In a bearing, in combination with relatively rotatable bearing members, an oil well for supplying the bearing surfaces of said members with oil, a cooling coil for said oil, and a housing for said coil having an inlet adjacent the periphery of said bearing surfaces.

30. In a bearing, in combination with relatively rotatable bearing members, an oil well for supplying the bearing surfaces of said members with oil, a cooling coil in said well, a housing for said coil having an inlet adjacent the periphery of said bearing surfaces, and means associated with the rotatable bearing member for directing the oil into said inlet as it comes from the bearing surfaces.

31. In a bearing, in combination with relatively rotatable bearing members, an oil well for supplying the bearing surfaces of said members with oil, a cooling coil in said well, a housing for said coil having an inlet adjacent the periphery of said bearing surfaces, and vanes on the rotatable bearing member for feeding the oil into said inlet as it comes from the bearing surfaces.

32. In a bearing, in combination with relatively rotatable bearing members, an oil well for supplying the bearing surfaces of said members with oil, a cooling coil in said well, and a sectional housing for said coil removable independently of said coil, and having an inlet opposed to the bearing surfaces in substantial alignment therewith.

33. A thrust bearing comprising rotatable and stationary bearing surfaces, an oil well for supplying said bearing surfaces with lubricant, a cooling coil in the well, and baffle walls associated with said coil for controlling the circulation with respect to said coil, said baffle walls having an inlet spaced from but in substantial alignment with said bearing surfaces.

34. In a bearing, in combination with a rotatable bearing member and a stationary bearing member, an oil well in which said bearing members operate, a cooling coil in said well, means associated with said rotatable bearing member for circulating oil into heat-interchanging relation with said coil as it comes from the bearing surfaces, and means whereby the oil will be substantially free of entrained air as it circulates to the bearing members.

35. In a bearing, in combination with a rotatable bearing member and a stationary bearing member, an oil well in which said bearing members operate, a cooling coil in said well, means associated with said rotatable bearing member for circulating oil into heat-interchanging relation with said coil as it comes from the bearing surfaces, and means in proximity to the periphery of said rotatable member for preventing eddying of the oil.

36. In a bearing, in combination with a rotatable bearing member and a stationary bearing member, an oil well in which said bearing members operate, a cooling coil in said well, baffle walls associated with said coil for directing the circulating oil into heat-interchanging relation with said coil, and a baffle plate between said coil and said bearing members.

37. In a bearing, in combination with a rotatable bearing member and a stationary bearing member, an oil well in which said bearing members operate, a cooling coil in said well, baffle walls associated with said coil for directing the circulating oil into heat-interchanging relation with said coil, and inlet and outlet connections for said coil adapted to permit said coil to be removed from said well as a unit.

38. In a bearing, in combination with a rotatable bearing member and a stationary bearing member, an oil well in which said bearing members operate, a cooling coil in said well, baffle walls associated with said coil for directing the circulating oil into heat-interchanging relation with said coil, said baffle walls being removable as a unit.

39. In a bearing, in combination with a rotatable bearing member and a stationary bearing member, an oil well in which said bearing members operate, and a cooling coil in said well, the peripheral portion of said rotatable bearing member being formed to direct oil into heat-interchanging relation with said coil as it comes from said bearing members.

40. In a bearing, in combination with a rotatable bearing member and a stationary bearing member, an oil well in which said bearing members operate, and a cooling coil in said well adjacent said bearing members, the peripheral portion of said rotatable bearing member being formed to act on the oil as it leaves said bearing members and circulate the same through said coil.

41. In a bearing, in combination with a rotatable bearing member and a stationary bearing member, an oil well in which said bearing members operate, a cooling coil in said well adjacent said bearing members, the peripheral portion of said rotatable bearing member being formed to act on the oil as it leaves said bearing members and circulate the same through said coil, and walls associated with said coil for directing the circulation of oil therethrough.

42. In a bearing, in combination with relatively rotatable bearing members, an oil well for supplying the bearing surfaces of said members with oil, a cooling coil for said oil, and a housing for said coil having an inlet adjacent the periphery of said bearing surfaces and serving to direct the flow of oil about said coil.

43. In a bearing including relatively rotatable means having cooperating wearing surfaces, a body of oil surrounding said bearing, whereby rotation of said rotatable means causes a portion of said oil to whirl and move outwardly, cooling means, and baffle means whereby some of said portion is caused to pass and re-pass said cooling means within the confines of said baffle means and some of the oil so cooled leaves the confines of said baffle means and is again drawn into said whirling portion without first going to said wearing surfaces.

44. In a bearing including an oil well containing a body of oil, means for causing a portion of said body of oil to assume a vortex-like flow in said well and allowing some of the oil to leave said vortex and return to the wearing parts of said bearing, and cooling means disposed in substantially opposite arcuate portions of said flow in any cross section of said vortex including the bearing axis.

45. In a bearing, in combination with relatively rotatable bearing members, an oil well for supplying the bearing surfaces of said members with oil, a cooling coil for said oil, and a housing for said coil having an inlet adjacent the periphery of said bearing surfaces, said housing being spaced from the periphery of the bearing members to provide a passage through which oil will flow to mingle with the oil flowing from the bearing surfaces to said inlet.

46. In a bearing, in combination with relatively rotatable bearing members, an oil well for supplying the bearing surfaces of said members with oil, a cooling coil for said oil, and a housing for said coil having an inlet spaced from and in substantial alignment with the periphery of said bearing surfaces.

47. In a bearing, in combination with relatively rotatable bearing members, an oil well for supplying the bearing surfaces of said members with oil, a cooling coil in said well surrounding said bearing members, a wall within said coil spaced from the periphery of the bearing members to provide a passage for the flow of oil, and a wall above said coil, providing with said first-named wall an oil inlet to said coil.

48. In a bearing, in combination with relatively rotatable bearing members, an oil well for supplying the bearing surfaces of said members with oil, a cooling coil for said oil, a housing for said coil having its inner wall spaced from the periphery of the bearing members to provide a passage for the upward flow of oil outside of said bearing members, said housing having an inlet in substantial alignment with the periphery of said bearing surfaces, and a passage for the flow of oil to the inner side of said bearing surfaces.

49. In a bearing, in combination with relatively rotatable bearing members, a bearing housing containing a body of oil, a cooling coil, a housing for said cooling coil having an inlet in proximity to said bearing surfaces through which oil is forced to said coil by the movement of the rotatable bearing member, and a passage through which oil returns to said bearing surfaces.

50. In a bearing, in combination with relatively rotatable bearing members, an oil well for supplying the bearing surfaces of said members with oil, a cooling coil in said well surrounding said bearing surfaces and spaced therefrom, and means housing said coil and having an opening on its inner side through which oil is circulated into heat interchanging relation with said coil by the movement of the rotatable bearing member.

51. In a bearing, in combination with relatively rotatable bearing members, an oil well in which said bearing members operate, a cooling coil in said well, and means in said well including a substantially horizontal wall above said coil but below the surface of said oil for directing the flow of oil as it comes from said bearing members.

52. A bearing including an oil well, relatively rotatable means having cooperating bearing surfaces, disposed in said oil well whereby the oil is whirled by said rotatable means and thrown outwardly, a baffle spaced from said relatively rotatable means to form a passage through which oil will be drawn from the lower part of said well into the low pressure zone near said whirling portion, the radial width of said passage at said zone being such as to have the flow in said passage wholly towards said whirling portion, and cooling means in said well radially outside of said baffle.

53. In a bearing, in combination with a rotatable bearing member and a stationary bearing member, an oil well in which said bearing members operate, a cooling coil in said well spaced from said stationary bearing member to provide a passage, a baffle wall above said coil, and a vertical wall within said oil well on the opposite side of said coil from said stationary bearing member.

In testimony whereof I have signed this specification.

HARRY A. S. HOWARTH.